United States Patent

[11] 3,587,798

| [72] | Inventor | Ralph H. Schuman Cleveland, Ohio |
|---|---|---|
| [21] | Appl. No. | 760,577 |
| [22] | Filed | Sept. 18, 1968 |
| [45] | Patented | June 28, 1971 |
| [73] | Assignee | The Warner & Swasey Company Cleveland, Ohio |

[54] TIME AND SPEED MODULATED CLUTCH AND BRAKE
3 Claims, 3 Drawing Figs.

[52] U.S. Cl. .................................................. 192/12,
 192/104, 192/84, 188/161, 242/45, 310/95
[51] Int. Cl. ...................................................... F16d 67/06
[50] Field of Search ......................................... 192/12.2,
 18.2, 103, 104; 310/95; 242/45 (Inquired), 75.51
 (Inquired)

[56] References Cited
UNITED STATES PATENTS

| 2,788,104 | 4/1957 | Mason | 192/18.2X |
| 2,816,635 | 12/1957 | Danly et al. | 192/12.2 |
| 2,949,249 | 8/1960 | Gravenstreter et al. | 310/95X |
| 3,131,342 | 4/1964 | Wilkerson | 192/104UX |
| 3,252,022 | 5/1966 | Smith | 192/104UX |
| 3,352,396 | 11/1967 | Mosley | 192/104X |
| 3,385,986 | 5/1968 | Smith | 310/95 |

Primary Examiner—Benjamin W. Wyche
Attorney—Yount, Flynn & Tarolli

ABSTRACT: Drive system for a rotatable, variable inertia load comprising a constant speed input drive, a variable-torque, electrically operated friction clutch for connecting the input drive to the load, and a variable-torque, electrically operated friction brake for the load. When starting the load, a first ramp generator produces an increasing ramp voltage which is compared to a load velocity signal to provide an error signal for energizing the clutch. When stopping the load, a second ramp generator produces a decreasing ramp voltage which is compared to a load velocity signal to provide an error signal for energizing the brake.

PATENTED JUN28 1971  3,587,798

INVENTOR.
RALPH H. SCHUMAN
BY
Young, Flynn & Tarolli
ATTORNEYS

3,587,798

TIME AND SPEED MODULATED CLUTCH AND BRAKE

This invention relates to a drive system for a variable inertia load, and more particularly to a starting arrangement and a stopping arrangement for such a load.

Various loads, such as a rotary spool for wire in a wire-twisting machine, have different inertias at different times in their use. For example, a wire spool has its minimum inertia when empty and a much higher inertia when full. It is desirable to start and stop such a spool in a controllable fashion, for example, to minimize the possibility of wire breakage during starting, or to insure that the stop will be completed before the tail end of the wire is lost.

One aspect of the present invention relates to a starting arrangement in a drive system for accelerating a load from a rest position up to full speed substantially in a predetermined period of time, regardless of the inertia of the particular load.

Another aspect of the present invention relates to a stopping arrangement in a drive system for decelerating a load to a full stop substantially in a predetermined period of time, irrespective of the load inertia.

In its complete embodiment the present drive system embodies both a starting arrangement and a stopping arrangement as just described, with the time period for stopping being much shorter than the time period for starting.

Accordingly, it is a principal object of the present invention to provide a novel and improved drive system for a variable inertia load having novel arrangements for controlling the starting and the stopping of the load in a controlled fashion, irrespective of the load's inertia.

Another object of this invention is to provide in such a drive system a novel and improved starting arrangement for accelerating the load from a rest condition up to full speed substantially in a predetermined period of time, irrespective of the inertia of the load.

Another object of this invention is to provide in such a drive system a novel starting arrangement having a variable-torque, electrically energizable clutch connected between a constant speed input drive and the load, the clutch being energized by an error signal produced by comparing a progressively increasing ramp voltage to a feedback voltage which is proportional to the actual speed of the load.

Another object of this invention is to provide in such a drive system a novel and improved stopping arrangement for bringing the load to a full stop substantially in a predetermined period of time, irrespective of the inertia of the load.

Another object of this invention is to provide in such a drive system a novel stopping arrangement having a variable-torque, electrically energizable brake connected to the load and energized by an error signal produced by comparing a progressively decreasing ramp voltage to a feedback voltage which is proportional to the actual speed of the load.

Further objects and advantages of this invention will be apparent from the following detailed description of a presently preferred embodiment, with reference to the accompanying drawing in which.

Figure 1:
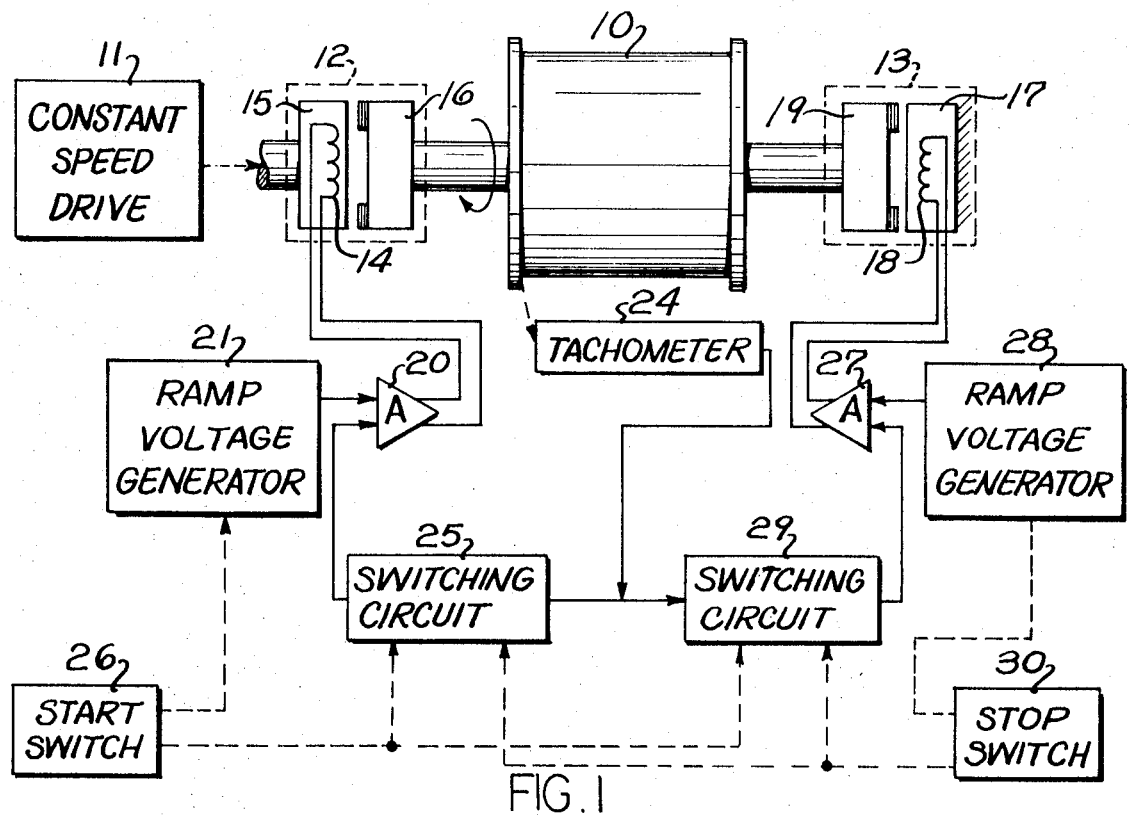
FIG. 1 shows the present drive system schematically.

Referring to FIG. 1, in the illustrated embodiment the present system comprises a variable inertia load in the form of a spool 10 for receiving wire strand, a constant speed input drive 11, a variable-torque, electrically operated clutch 12 connecting the input drive to the load spool 10, and a variable-torque, electrically operated brake 13 for braking the load 10 to a stop.

The clutch 12 preferably is a torque-sustaining, spring-released, electrically applied, electromagnetic friction clutch having confronting frictionally engageable surfaces which are adapted to slip with respect to each other when the operating coil 14 of the clutch is insufficiently energized to sustain the load torque. In general, the magnitude of the current through this coil determines the torque capacity of the clutch. When the load on the clutch exceeds its torque capacity, as determined by the coil current, the driving half 15 of the clutch will rotate faster than, or slip with respect to, the driven half 16 of the clutch.

The brake 13 is essentially similar, except that the half 17 of the brake which carries the operating coil 18 is fixedly mounted against rotation. The opposite half 19 of the brake is connected to the load spool 10 to rotate in unison with it. The brake has confronting, frictionally engageable surfaces which are brought into engagement with each other in response to energization of the operating coil 18. The torque capacity of the brake varies with the coil current, and if the load on the brake exceeds its torque capacity the load-connected half 19 of the brake will slip, or rotate, with respect to the fixed, coil-carrying half 17.

Figure 2:
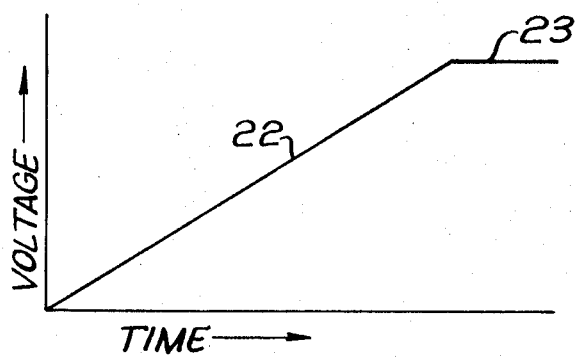
FIG. 2 shows the voltage versus time characteristic of the ramp voltage generator in the load-starting arrangement of the FIG. 1 system.

When the load 10 is being started, the operating coil 14 of clutch 12 is connected to the output of a first operational amplifier 20. This amplifier receives a first input signal from a first ramp voltage generator 21, whose voltage versus time characteristic is shown in FIG. 2. This ramp voltage progressively increases linearly with time along the straight-line slope 22 in FIG. 2, at the end of which it levels off at the maximum amplitude level 23. The rate at which this ramp voltage increases is relatively gradual, for example, in one practical embodiment requiring about 45 seconds to reach the maximum amplitude level 23.

The amplifier 20 receives a second input signal from a tachometer 24, which is driven by the load spool 10 to produce a voltage whose instantaneous magnitude is proportional to the instantaneous rotational speed of the load spool 10. The output signal from the tachometer 24 is applied to the input of amplifier 20 through a switching circuit 25, which is arranged to close in response to the closing of a start switch 26 and to be opened in response to the operation of a stop switch 30. The start switch 26, when closed, also turns on the ramp voltage generator 21. The start switch 26 is connected to the brake 13 through a switching circuit 29 so as to cause the brake to be released in response to the closing of start switch 26. The operational amplifier 20 compares the signal from the ramp voltage generator 21 to the load velocity feedback signal from the tachometer 24. The amplifier difference between the ramp generator signal and the tachometer signal is an error signal which is applied to the operating coil 14 of clutch 12. The magnitude of this error signal is proportional to the difference between the actual speed of the load and a speed corresponding to the instantaneous magnitude of the ramp generator signal. The magnitude of this error signal determines the torque capacity of the clutch 12.

To start the load spool 10 from a rest position, the user closes the start switch 26 to cause the switching circuit 29 to disengage the brake 13 or any additional brake (not shown) which had been holding the load stopped, and to simultaneously start the ramp voltage generator 21 and connect the tachometer output to the amplifier 20. Initially, the entire ramp generator signal will, after amplification by amplifier 20, be applied as the error signal to the operating coil 14 of the clutch to bring the driven half 16 of the clutch into frictional, torque-transmitting engagement with the driving half 15, which is being driven at constant speed by the input drive 11. As the load 10 begins to rotate it causes the tachometer 24 to produce a load velocity feedback signal which is compared to the ramp generator signal, and the difference between them is amplified to provide the error signal which energizes the operating coil of the clutch. The higher the inertia of the load spool 10, the greater will be this error signal which provides the current for the operating coil 14 of the clutch. The higher the coil current, the greater will be the output torque of the clutch.

By controlling the torque capacity of the clutch in accordance with the difference between a speed which corresponds to the instantaneous magnitude of the ramp voltage output from generator 21 and the actual speed of the load, the load spool 10 is brought up to full speed substantially in a predetermined period of time, regardless of its inertia, which may change between the time when it first starts to turn and the time when it reaches full speed.

When the ramp voltage from generator 21 exceeds the tachometer voltage with the load spool 10 being driven at full speed, the amplifier saturates and causes full voltage to be applied to the clutch coil to maintain the 1 to 1 drive and prevent any slippage in the clutch. Preferably, after the amplifier 20 saturates, an additional energization source (not shown) is connected to the clutch coil to maintain full clutch current and the amplifier 20 is disconnected from the clutch coil by a suitable switching arrangement (not shown).

The load-stopping arrangement includes, in addition to the brake 13, an operational amplifier 27, a second ramp voltage generator 28 having its output connected to the input side of amplifier 27, a switching circuit 29 connected between the output of the tachometer 24 and the input side of amplifier 27, and a stop switch 30 connected to the switching circuits 25 and 29 and to the ramp voltage generator 28 to open circuit 25, and to close circuit 29 and start the ramp voltage generator 28 simultaneously in response to the closing of the stop switch 30.

Figure 3:
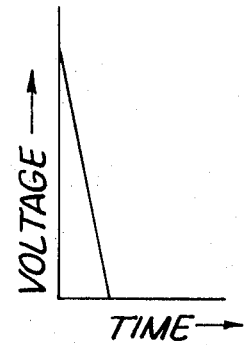
FIG. 3 shows the voltage versus time characteristic of the ramp voltage generator in the load-stopping arrangement of the present system.

The ramp voltage generator 28 has the output voltage versus time characteristic indicated in FIG. 3, providing an output voltage which decreases linearly from a maximum value down to zero in a relatively short time, such as, 5 seconds.

The operational amplifier 27 compares the ramp voltage output from generator 28 to the load velocity feedback voltage from tachometer 24. The difference between these two input signals to amplifier 27 is amplified and applied as the error signal to the operating coil 18 of the brake 13 for energizing the brake coil.

To stop the rotating load spool 10, the user closes the stop switch 30 to disengage the driving clutch 12 and simultaneously start the ramp voltage generator 28 and connect the tachometer 24 to the operational amplifier 27. The amplifier 27 subtracts the progressively decreasing ramp voltage from the load velocity voltage, and amplifies the difference between them to provide an error signal whose magnitude determines the torque capacity of the brake 13. The higher the inertia of the load, the greater will be the error signal current which is applied to the brake coil 18 and, therefore, the greater will be the torque capacity of the brake.

By controlling the torque capacity of the brake in accordance with the difference between the actual speed of the load spool 10 and a speed which corresponds to the instantaneous magnitude of the decreasing ramp voltage produced by generator 28, the load spool 10 is brought to a full stop substantially in a predetermined period of time, irrespective of its inertia.

From the foregoing, it can be seen that the present invention provides first control means (26, 30) operable to initiate a change in movement of the load and variable force transmitting means (12, 13) for effecting the change of movement. Also, second control means (21, 28) generates ramp signals for controlling the rate of movement in combination with a feedback signal from the tachometer 24.

While a presently-preferred embodiment of this invention has been disclosed with reference to the accompanying drawing, it is to be understood that various modifications, omissions and adaptations which depart from the disclosed embodiment may be adopted without departing from the scope of the present invention. For example, the present starting arrangement may be used in a drive system which does not have the present stopping arrangement, and vice versa.

I claim:

1. A drive system for a variable inertia load comprising:
   a substantially constant speed input drive;
   a variable-torque clutch connected between said input drive and the load, said clutch having electrically energizable means for selectively varying its torque capacity;
   a first voltage generator operable during starting of the load to generate a voltage which increases progressively over a period of time;
   means for producing a load velocity signal proportional to the speed of the load;
   means operable during starting of the load for comparing said load velocity signal to the output voltage of said first generator to produce an error signal proportional to the difference between the actual speed of the load and a speed corresponding to the instantaneous magnitude of the output voltage of the first generator;
   means operable during starting of the load for applying said error signal to said electrically energizable means on the clutch to energize the latter;
   a variable-torque brake operatively associated with the load for braking the latter to a stop, said brake having electrically energizable means for selectively varying its torque capacity;
   a second voltage generator operable during stopping of the load to generate a voltage which decreases progressively over a period of time;
   means operable during stopping of the load for comparing said load velocity signal to the output voltage of said second generator to produce an error signal proportional to the difference between the actual speed of the load and a speed corresponding to the instantaneous magnitude of the output voltage of said second generator;
   and means operable during stopping of the load for applying said last-mentioned error signal to said electrically energizable means on the brake to energize the latter.

2. A machine for winding wire on a rotatable spool comprising a spool on which wire is wound, a motor operating at a constant speed, clutch means for connecting and disconnecting said motor to and from said spool, said clutch means having a clutch input element connected to said motor and a clutch output element connected to said spool and clutch control means for varying the torque-transmitting capability of said clutch means, a brake having first and second cooperating braking elements and brake control means for varying the braking capability of said brake, switch means actuatable to effect the starting and stopping of the drive from said motor to said spool, signal generator means responsive to said switch means for generating a first signal which increases in time to a predetermined level when said switch is actuated to effect the drive to said spool and a second signal which decreases with time from a predetermined level when said switch means is actuated to stop the drive to said spool, speed-sensing means for sensing the rotational speed of said spool and providing a speed signal, second control means responsive to said first signal and said speed signal to provide a third signal for controlling the force-transmitting characteristics of said clutch means on starting and responsive to said second signal and said speed means to provide a fourth signal for controlling the force-transmitting characteristics of said brake on stopping and means for connecting said second control means to said clutch control means and said brake control means to effect operation thereof in accordance with said third and fourth signals, respectively.

3. In a drive system having a drive for driving an inertial load whose change in rate of change of position is to be controlled, said system including force-transmitting means of variable force-transmitting capability for controlling movement of said load, means operatively connecting said force-transmitting means and said load in driving relationship whereby the force transmitted by said force-transmitting means affects the movement of said load, first control means actuatable to render said force-transmitting means effective to transmit force to change load movement, signal generator means responsive to said first control means for providing control signals having a characteristic which varies with time in accordance with a desired change in load movement, speed sensing means for sensing the speed of said load and providing a speed signal, second control means responsive to said speed-sensing means and said signal generator means for varying the force-transmitting characteristics of said force-transmitting means to cause the movement of said load to follow said characteristic during a change in load movement, said first control means being actuatable to accelerate said load and said variable force-transmitting means comprising a drive coupling having an output connected to drive said load, means connecting said first control means to said signal generator means to actuate the latter in response to the operation of said first control means to accelerate said load, means connecting said second control means to said drive coupling to control its force-transmitting capability, said first control means being actuatable to stop the drive to said load and said force-transmitting means further comprising a brake for braking said load, said brake having an input element and a cooperating element and means for controlling the maximum force transmitted therebetween, means connecting said first control means to said signal generator means to actuate the latter when the first control means is actuated to stop the drive to said load, said second control means including means generating a signal having a characteristic which varies in accordance with the desired slowdown of the load, and means connecting said second control means to said brake to control the force transmitted between said input element and said cooperating element, said input element being connected to said load to be driven thereby.